United States Patent
Levavasseur (10) Patent No.: US 12,509,032 B2
(45) Date of Patent: Dec. 30, 2025

(54) MEASUREMENT METHOD WITH SYNCHRONOUS SUBSAMPLING

(71) Applicant: SAFRAN ELECTRONICS & DEFENSE, Paris (FR)

(72) Inventor: Didier Levavasseur, Moissy-Cramayel (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 1051 days.

(21) Appl. No.: 17/550,566

(22) Filed: Dec. 14, 2021

(65) Prior Publication Data

US 2022/0185247 A1 Jun. 16, 2022

(30) Foreign Application Priority Data

Dec. 15, 2020 (FR) ........................................ 2013284

(51) Int. Cl.
*B60T 8/17* (2006.01)
*B60T 8/32* (2006.01)
(Continued)

(52) U.S. Cl.
CPC ............ *B60T 8/1703* (2013.01); *B60T 8/325* (2013.01); *B64C 25/46* (2013.01); *G01R 19/2509* (2013.01)

(58) Field of Classification Search
CPC ........ B60T 8/1703; B60T 8/325; B64C 25/46; G01R 19/2509; H03D 2200/006; H03D 2200/0086; H03D 1/2245
See application file for complete search history.

(56) References Cited

U.S. PATENT DOCUMENTS

2019/0316937 A1 * 10/2019 Guillot .................. G01D 5/2415

FOREIGN PATENT DOCUMENTS

CN 101038310 A * 9/2007
DE 102020006900 A1 * 6/2021
(Continued)

OTHER PUBLICATIONS

Bau et al, Cost-effective system for the characterization of microstructures vibrating in out-of-plane modes, Sensors and Actuators A: Physical, Elsevier BV, NL, Feb. 5, 2008, pp. 270-275, vol. 142, No. 1.
(Continued)

*Primary Examiner* — Catherine T. Rastovski
*Assistant Examiner* — Yossef Korang-Beheshti
(74) *Attorney, Agent, or Firm* — MUNCY, GEISSLER, OLDS & LOWE, P.C.

(57) ABSTRACT

An electronic circuit (12) connected to a variable-excitation sensor (24) and comprising:
a digital envelope detector (20) arranged to acquire signal that is produced by the sensor in response to an excitation signal, the detector comprising:
an analog-to-digital converter (22) arranged to sample the measurement signal in such a manner as to produce sample points during successive observation windows of duration T that comprise a number $N_S$ of sample points, the sample points being spaced apart by a sampling period $T_S$, the sampling period $T_S$ and the duration T being such that:

$T_S = N_P \cdot T_0 + (N_T/N_S) \cdot T_0$ and $T = N_S \cdot T_S$, where $T_0$ is one excitation period of the excitation signal, where $N_P$, $N_T$, and $N_S$ are non-zero natural integers, and where $N_T$ is not a multiple of $N_S$.

15 Claims, 6 Drawing Sheets

(51) Int. Cl.
    *B64C 25/46*     (2006.01)
    *G01R 19/25*     (2006.01)

(56) References Cited

FOREIGN PATENT DOCUMENTS

| EP | 0587844 B1 | 5/1998 | |
|---|---|---|---|
| WO | WO-2019093074 A1 * | 5/2019 | .............. G01D 5/20 |
| WO | WO2020/070232 A1 | 4/2020 | |

OTHER PUBLICATIONS

Bad M et al, Contactless Electromagnetic Excitation of Conductive Microstructures for Resonant Sensors, Instrumentation and Measurement Technology Conference Proceedings, 2007 IEEE, IEEE, PI , May 31, 2007, pp. 1-6.

Petrovic P, New Digital Multimeter for Accurate Measurement of Synchronously Sampled AC Signals, IEEE Transactions on Instrumentation and Measurement, IEEE Service Center, Piscataway, NJ, US, Jun. 30, 2004 (Jun. 30, 2004), pp. 716-725, vol. 53, No. 3.

O'Donoghue Ki Lian et al, Low Cost Super-Nyquist Asynchronous Demodulation for Use in EM Tracking Systems, IEEE Transactions on Instrumentation and Measurement, IEEE Service Center, Piscataway, NJ, US, Feb. 28, 2015, pp. 458-466, vol. 64, No. 2.

* cited by examiner

| NS | fS (kHz) | Filters harmonics (up to order ... included) |
|---|---|---|
| 18 | 45 | 7 |
| 19 | 47.5 | 17 |
| 21 | 52.5 | 19 |
| 22 | 55 | 9 |
| 23 | 57.5 | 21 |
| 26 | 65 | 11 |
| 27 | 67.5 | 25 |
| 28 | 70 | 5 |
| 29 | 72.5 | 27 |
| 31 | 77.5 | 29 |
| 32 | 80 | 2 |
| 33 | 82.5 | 31 |
| 34 | 85 | 15 |
| 35 | 87.5 | 5 |
| 36 | 90 | 7 |
| 37 | 92.5 | 35 |
| 38 | 95 | 17 |
| 39 | 97.5 | 37 |
| 41 | 102.5 | 39 |
| 42 | 105 | 19 |
| 43 | 107.5 | 41 |
| 44 | 110 | 9 |
| 45 | 112.5 | 7 |
| 46 | 115 | 21 |
| 47 | 117.5 | 45 |
| 49 | 122.5 | 47 |
| 51 | 127.5 | 49 |
| 52 | 130 | 11 |
| 53 | 132.5 | 51 |
| 54 | 135 | 25 |
| 55 | 137.5 | 9 |
| 56 | 140 | 5 |
| 57 | 142.5 | 55 |
| 58 | 145 | 27 |
| 59 | 147.5 | 57 |
| 61 | 152.5 | 59 |
| 62 | 155 | 29 |
| 63 | 157.5 | 61 |
| 64 | 160 | 2 |
| 65 | 162.5 | 11 |
| 66 | 165 | 31 |
| 67 | 167.5 | 65 |
| 68 | 170 | 15 |
| 69 | 172.5 | 67 |
| 70 | 175 | 5 |
| 71 | 177.5 | 69 |
| 72 | 180 | 7 |
| 73 | 182.5 | 71 |
| 74 | 185 | 35 |
| 76 | 190 | 17 |
| 77 | 192.5 | 75 |
| 78 | 195 | 37 |
| 79 | 197.5 | 77 |

MEASUREMENT METHOD WITH SYNCHRONOUS SUBSAMPLING

The invention relates to the field of measurement methods making use of variable-excitation sensors.

BACKGROUND OF THE INVENTION

The antiskid function conventionally implemented in the braking system of an aircraft requires measurements to be made of the speeds of so-called "braked" wheels of the aircraft (i.e. the speeds of its wheels that are fitted with brakes).

Figure 1:
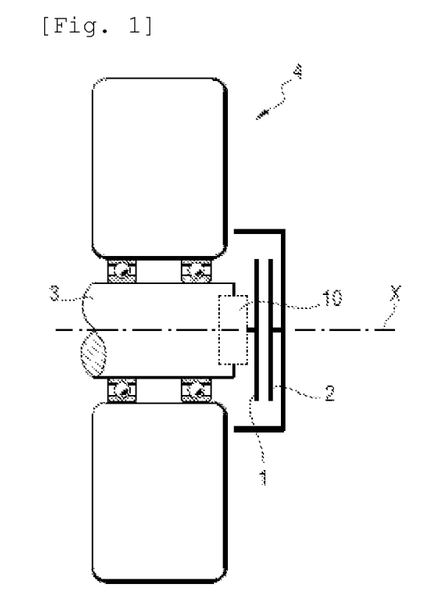
FIG. 1 shows a simplified view of an aircraft wheel, of a tachometer, and of an electronic unit (WRDC)
Figure 2:
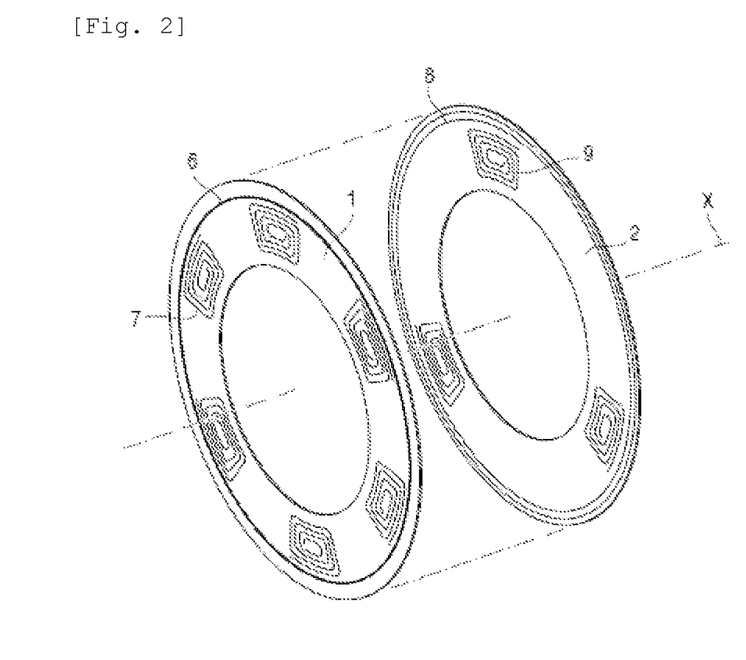
FIG. 2 shows a first printed circuit and a second printed circuit of the tachometer.

With reference to FIGS. 1 and 2, proposals have been made for this purpose to fit each braked wheel with a new type of tachometer that makes use of electromagnetic coupling between a first printed circuit 1 and a second printed circuit 2 that are mounted facing each other, one being secured to the axle 3 carrying the wheel 4 and the other being secured to the wheel 4. The first printed circuit 1 and the second printed circuit 2 are circular in shape and they are centered on the axis of rotation X of the wheel 4. The first printed circuit 1 has first tracks that define at least one transmitter winding 6 and at least one measurement winding 7 (in this example one transmitter winding 6 and six measurement windings 7). The second printed circuit 2 has second tracks defining at least one receiver winding 8 and at least one target winding 9 (in this example one receiver winding 8 and three target windings 9). The transmitter winding 6 and the measurement windings 7 are connected to an electronic unit 10 that is incorporated in the axle 3 in this example. The electronic unit 10 is a data concentrator referred to as a "wheel remote data concentrator" (WRDC).

The electronic unit 10 generates an excitation signal and applies it to the transmitter winding 6. When the transmitter winding 6 is excited by the excitation signal, an induced signal appears in the receiver winding 8 and is then transmitted by the target windings 9 so as to generate a measurement signal in each measurement winding 7, which measurement signal is representative of the angular position of the target windings 9, and thus of the second printed circuit 2 and of the wheel 4.

The angular position of the second printed circuit 2 is determined from the voltage levels Va and Vb of the measurement signals picked up by the electronic unit 10 across the terminals of the two active measurement windings 7 in the angular sector in question. Ideally, these measurement signals are undistorted sinewaves (pure fundamental signals) forming the response of the tachometer to pure sinewave excitation.

In order to obtain the voltage levels Va and Vb of the measurement signals, it is possible to use an analog envelope detector or a digital envelope detector.

By way of example, an analog envelope detector uses a fullwave rectifier or a switching demodulator. Either way, the performance of the detector is totally dependent on the level of distortion and on the offset introduced by the active components in the amplification system, and it is difficult with this solution to achieve the required accuracy. Switching demodulation is also sensitive to the phase of the switching signal and therefore does not constitute an appropriate solution.

A digital envelope detector may make use of a synchronous demodulator, in particular a synchronous quadrature demodulator.

Under such circumstances, it is possible to be completely unaffected by the influence of the offset and of the harmonics of the excitation frequency, thereby making it possible to achieve the performance required for the antiskid function (0.01° for the angular position of a wheel). Nevertheless, it is still necessary to comply with Shannon's theorem on the harmonics that are to be eliminated: if the excitation frequency of the excitation signal is equal to 1 megahertz (MHz) (fundamental of the measurement signal), then the measurement signal needs to be sampled at 4 MHz in order to eliminate the second harmonic, at 6 MHz in order to eliminate also the third harmonic, etc.

In order to obtain the desired level of performance, a high degree of oversampling is therefore used for the purpose of increasing the resolution of the analog-to-digital converter.

When the excitation frequency is low, e.g. less than 10 kilohertz (kHz), that method is entirely appropriate. By way of example, 72 measurement points are produced for each period with excitation at 3 kHz. Oversampling thus leads to acquiring 216 thousand samples per second (ksps) for an excitation frequency of 3 kHz, which leaves a wide range of compatible analog-to-digital converters operating at 12 or more bits.

Nevertheless, the need to increase the excitation frequency in order to increase the useful signal level and the desire to exclude harmonics of even higher orders leads quickly to reaching sampling frequencies that may be as much as several tens of megahertz, and thus leads to electronics that is expensive and that is associated with high processing power. In order to benefit from the advantages of a digital demodulator with an excitation signal at 1 MHz, it is necessary to have an analog-to-digital converter that is capable of sampling at at least 32 million samples per second (Msps). However, such components are rare and above all very expensive, particularly since the above-described tachometer application involves simultaneous sampling of six sensor output channels (from the six measurement windings 7).

An additional difficulty lies in the volume of processing that needs to be absorbed: processing six 14-bit samples at 32 Msps requires the use of a field programmable gate array (FPGA) capable of absorbing a data stream at 2.7 gigabits per second (Gb/s). The associated electronics is then necessarily complicated and expensive.

Analog demodulation would therefore appear to be the only solution that can be implemented for excitation frequencies greater than a few hundreds of kilohertz. As described above, that solution gives rise to severe constraints on the offset and on the distortion generated by the amplification system.

OBJECT OF THE INVENTION

An object of the invention is to increase the excitation frequency of a variable excitation sensor, but without increasing its cost or the complexity of processing the measurements, and without reducing the accuracy of said measurements.

SUMMARY OF THE INVENTION

In order to achieve this object, there is provided an electronic circuit arranged to be connected to a variable-excitation sensor for measuring a parameter, the circuit comprising:
  synthesizer components arranged to use the same clock signal to produce both an excitation frequency and also a sampling frequency, together with an excitation signal at the excitation frequency, the excitation signal being applied as input to the sensor; and a digital envelope detector receiving as input a measurement signal that is produced by the sensor in response to the excitation signal, the detector comprising:
an analog-to-digital converter arranged to sample the measurement signal at the sampling frequency in such a manner as to produce sample points during successive observation windows, each observation window having a duration T and comprising a number $N_S$ of sample points, the sample points being spaced apart by a sampling period $T_S$, the sampling period $T_S$ and the duration T being such that:

$$T_S = N_P \cdot T_0 + (N_T/N_S) \cdot T_0 \text{ and } T = N_S \; T_S,$$

where $T_0$ is one excitation period of the excitation signal, where $N_P$, $N_T$, and $N_S$ are non-zero natural integers, and where $N_T$ is not a multiple of $N_S$; and at least one processor component arranged to implement a synchronous demodulator arranged to produce, for each observation window, an output signal value on the basis of which the parameter is estimated.

Since the excitation frequency and the sampling frequency are generated from the same clock signal, they are therefore synchronized. The digital envelope detector thus performs synchronous subsampling of the measurement signal as produced by the sensor in response to the excitation signal. By appropriately selecting the value for $N_S$, the criteria applied to the sampling period and to the duration T allow the excitation frequency to be increased and enable the spectrum-folding problem to be handled while conserving a processing time for each sample point that is acceptable. It is therefore possible to benefit from high accuracy without any need to use an analog-to-digital converter that is very fast and without having substantial processing capacity available.

The electronic circuit of the invention thus benefits from the advantages of a digital envelope detector, while not increasing cost and not increasing the complexity of measurement processing.

There is also provided an electronic circuit as described above wherein the number of sample points Ns is defined so as to maximize elimination of harmonics of the excitation frequency and so as to maximize noise reduction in the digital envelope detector, while conserving a processing time allocated to each sample point that is acceptable given the performance of the analog-to-digital converter and of the processor module.

There is also provided an electronic circuit as described above wherein $N_T=1$.

There is also provided an electronic circuit as described above wherein $N_T \neq 1$.

There is also provided an electronic circuit as described above wherein the excitation signal is a sinewave signal.

There is also provided an electronic circuit as described above wherein the excitation signal is a squarewave signal.

There is also provided an electronic circuit as described above wherein the digital envelope detector includes two processor components comprising both an FPGA arranged to carry out the multiplication-accumulation operations performed in the synchronous demodulator and also a microcontroller arranged to carry out the other operations performed in the synchronous demodulator.

There is also provided an electronic circuit as described above further comprising an amplifier located upstream from the analog-to-digital converter, the amplifier including resistors forming part of a resistor network.

There is also provided an electronic circuit as described above wherein the sensor has a plurality of output channels, and wherein the analog-to-digital converter comprises a single converter block together with a number of sample-and-hold circuits equal to the number of output channels of the sensor.

There is also provided a method of designing an electronic circuit as described above, the method comprising the steps of:
defining an optimized value for the number of sample points $N_S$, said the optimized value maximizing elimination of harmonics of the excitation frequency and maximizing noise reduction in the digital envelope detector, while conserving a processing time that is allocated to each sample point that is acceptable given the performance of the analog-to-digital converter and given the processor component(s); and
configuring the electronic circuit by conferring said optimized value to the number of sample points Ns.

There is also provided an electronic unit including an electronic circuit as described above.

There is also provided a device comprising an electronic unit as described above and a variable-excitation sensor.

There is also provided a device as described above, the variable-excitation sensor being a tachometer arranged to measure the angular position and/or the angular speed of the wheel and comprising a first printed circuit and a second printed circuit that are adapted to be mounted facing each other, the first printed circuit being adapted to be mounted secured to an axle carrying the wheel, the second printed circuit being adapted to be mounted secured to the wheel, the first printed circuit comprising first tracks defining at least one transmitter winding and at least one measurement winding, the second printed circuit comprising second tracks defining at least one receiver winding and at least one target winding, and the electronic circuit being arranged to apply the excitation signal to the transmitter winding and to acquire the measurement signal from the measurement winding.

There is also provided an aircraft braking system comprising a wheel fitted with a brake and with a device as described above.

There is also provided an aircraft including a braking system as described above.

The invention can be better understood in the light of the following description of a particular, nonlimiting embodiment of the invention.

BRIEF DESCRIPTION OF THE DRAWINGS

Reference is made to the accompanying drawings, in which.

DETAILED DESCRIPTION OF THE INVENTION

In this example, the invention is implemented in the braking system of an aircraft. The aircraft has undercarriages, each of which includes a plurality of so-called "braked" wheels.

The speed of each braked wheel is measured by means of a tachometer similar to the tachometer shown in FIGS. 1 and 2 and by means of an electronic unit (or WRDC) 10 that is positioned as shown in FIG. 1.

Figure 3:
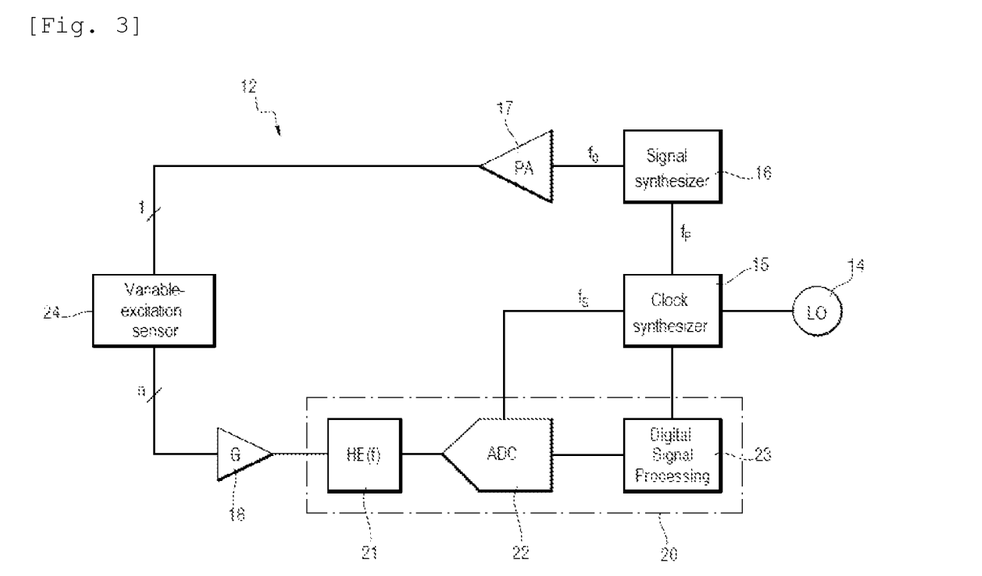
FIG. 3 shows the electronic circuit of the invention.

The electronic unit 10 includes an electronic circuit card having mounted thereon the components that form the electronic circuit 12 of FIG. 3.

The electronic circuit 12 includes a clock component 14, synthesizer components comprising a first synthesizer 15 for synthesizing frequencies and a second synthesizer 16 for synthesizing a signal, a first amplifier 17, a second amplifier 18, and a digital envelope detector 20.

The clock component 14 is a local oscillator.

The first amplifier 17 is a single-channel power amplifier. The second amplifier 18 is a six-channel small-signal amplifier of gain G.

The digital envelope detector 20 comprises an input filter 21, an analog-to-digital converter 22 having six channels, and a signal processor module 23. It should be observed that the input filter 21 is optional, since the intrinsic passband of the second amplifier 18 may suffice to maintain performance. The second amplifier 18 may be an inverting amplifier or anon-inverting amplifier, a differential amplifier, or an instrumentation amplifier.

The signal processor module 23 comprises one or more processor components that are adapted to execute instructions of a program for acting as a synchronous quadrature demodulator.

The program is stored in one or more memories connected to or incorporated in the processor component. By way of example, the processor component(s) may be a processor, a digital signal processor (DSP), a microcontroller, or indeed a programmable logic circuit such as a field programmable gate array (FPGA) or an application specific integrated circuit (ASIC).

The electronic circuit 12 is connected to the tachometer 24.

The first synthesizer 15 acquires a clock signal produced by the local oscillator 14, and from the clock signal it generates both a pilot frequency $f_P$ that is a multiple of the excitation frequency $f_0$ and also a sampling frequency $f_S$. The second synthesizer 15 acquires the pilot frequency $f_P$, generates the excitation frequency $f_0$ from the pilot frequency $f_P$, and generates an excitation signal having the excitation frequency $f_0$. In this example, the excitation signal is a sinewave signal and the excitation frequency $f_0$ is equal to 1 MHz.

The excitation signal is amplified by the first amplifier 17, and is then applied as input to the tachometer 24, specifically to the transmitter winding 6 of the first printed circuit 1. The electronic circuit 12 then acquires measurement signals output by the tachometer 24.

The angular position θ of the second printed circuit 2, from which the angular position and the angular speed of the wheel 4 are determined, satisfies the following equation:

$$\theta = \frac{A-B}{A+B} \cdot \frac{O}{2},$$

where A and B are respectively the voltage levels of the measurement signals Va and Vb output by the two active measurement windings 7 of the first printed circuit 1 in the angular sector in question, and where O is the angular spacing between the measurement windings 7. The voltage levels of the measurement signals Va and Vb are obtained by the digital envelope detector 20 that includes the synchronous quadrature demodulator.

Each measurement signal is applied as input to a respective channel of the second amplifier 18 and is amplified, and is then applied as input to the digital envelope detector 20 and is filtered by the input filter 21.

Each filtered measurement signal is then digitized by a respective one of the channels of the analog-to-digital converter 22, thereby producing sample points. The digitized measurement signal is applied as input to the synchronous quadrature demodulator, which generates an output signal. The angular position of the second printed circuit 2 is estimated from the output signals.

The sample points belong to successive observation windows of duration T, each including a certain number of sample points. The synchronous quadrature demodulator produces one output signal value for each observation window on the basis of the sample points in said observation window.

Figure 4:
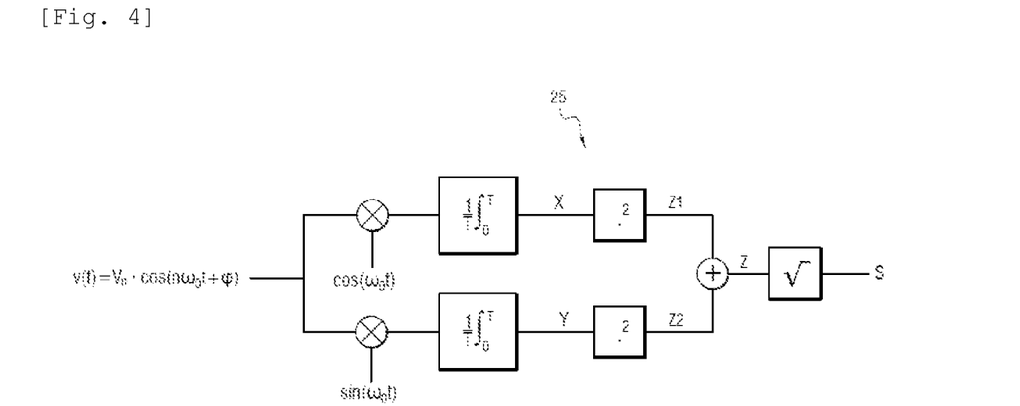
FIG. 4 shows a synchronous quadrature demodulator.

FIG. 4 shows a synchronous quadrature demodulator 25.

In a first branch, the measurement signal v(t), made up of the above-mentioned sample points, is multiplied by a first reference signal of the form $\cos(\omega_0 t)$, in order to obtain a first intermediate signal X, which is squared in order to obtain a first result signal Z1.

In a second branch, the measurement signal v(t) is multiplied by a second reference signal of the form $\sin(\omega_0 t)$, in order to obtain a second intermediate signal Y, which is squared in order to obtain a second result signal Z2.

The first result signal Z1 and the second result signal Z2 are summed in order to obtain a sum signal Z, and a square root of the sum signal Z is calculated in order to obtain a value for the output signal S for each observation window.

The measurement signal v(t), at the input of the synchronous quadrature demodulator 25, is a signal of the form $v(t)=\Sigma V_n \cdot \cos(n\omega_0 t+\varphi)$, where n is the order of the harmonic under consideration. The offset of the first intermediate signal X is zero, the fundamental of the first intermediate signal X is equal to $0.5 \cdot \cos(\varphi) \cdot V_1$, and the harmonics of the first intermediate signal X are zero from order 2 (included). Likewise, The offset of the second intermediate signal Y is zero, the fundamental of the second intermediate signal Y is equal to $-0.5 \cdot \sin(\varphi) \cdot V_1$, and the harmonics of the second intermediate signal Y are zero from order 2 (included). The offset of the output signal S is zero, and the fundamental of the output signal S is equal to $0.5 \cdot V_1$, and the harmonics of the output signal S are zero from order (included).

The input filter 21, located upstream from the analog-to-digital converter 22 (i.e. beside the input of the measurement signal), presents a frequency response that needs to be as flat as possible in the working band, so as to minimize the influence of component temperature drifts on the amplitude of the measurement signal that is transmitted after being digitized in the synchronous quadrature demodulator 25. By way of example, the input filter 21 may be a Butterworth filter.

Attention is now given more particularly to the sampling of the measurement signal.

The measurement signal is sampled at the sampling frequency $f_S$, i.e. the operation of the analog-to-digital converter 22 is clocked at the sampling frequency $f_S$.

In this example, the sampling is subsampling, i.e. the condition of Shannon's theorem is not satisfied. The subsampling is synchronous with the excitation frequency $f_0$ of the excitation signal: the same oscillator is used to generate both the excitation frequency $f_0$ and also the sampling frequency $f_S$.

The sampling of all of the channels needed for measurement must be simultaneous or almost simultaneous relative to the passband of the physical phenomenon being observed (rotation of the wheel 4).

In this example, the analog-to-digital converter 22 comprises the same number of sample-and-hold circuits as there are output channels from the sensor (i.e. the number of measurement windings 7 of the first printed circuit 1, which is equal to six) together with a single converter block, which serves to maximize conversion performance.

Figure 5:
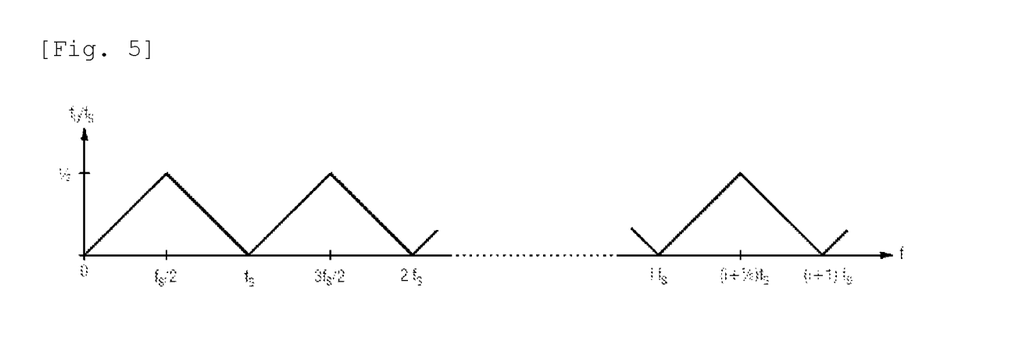
FIG. 5 is a graph comprising a triangle function curve illustrating the phenomenon of spectrum folding.

The subsampling leads to spectrum folding, which is shown in FIG. 5.

It can be seen that the apparent frequency $f_U$ of a signal sampled as a function of the sampling frequency is such that:

$$\frac{f_U}{f_S} = \frac{f}{f_S} - E\left(\frac{f}{f_S}\right) \text{ if } \frac{f}{f_S} - E\left(\frac{f}{f_S}\right) \le \frac{1}{2}$$

$$\frac{f_U}{f_S} = 1 - \left[\frac{f}{f_S} - E\left(\frac{f}{f_S}\right)\right] \text{ if } \frac{f}{f_S} - E\left(\frac{f}{f_S}\right) > \frac{1}{2}$$

It is generally preferred to use a sampling frequency that is high relative to the frequency of the measurement signal in order to avoid spectrum folding.

Nevertheless, as mentioned above, in order to be effective, conventional digital demodulators require a sampling frequency that is much higher than the frequency of the measurement signal. Thus, for high accuracy applications, it is generally considered that at least 32 sample points are needed within one period of the measurement signal in order to achieve sufficient effectiveness. For a 1 MHz signal, that would lead to a sampling frequency 32 MHz. Such a sampling frequency also makes it possible to eliminate harmonics up to order 8, but the associated electronics is then expensive to make since it requires analog-to-digital converters that are fast together with processor capacity that is considerable.

As used herein, subsampling that is synchronous with the generation of the excitation signal serves to mitigate this drawback.

Each measurement signal is sampled at the sampling frequency during successive observation windows. Each observation window has a duration T and contains a number of samples $N_S$. The samples are spaced apart at a sampling period $T_S$. In this example, the sampling period $T_S$ ($T_S=1/f_S$) and the duration T are such that:

$$T_S = N_P \cdot T_0 + \frac{N_T}{N_S} \cdot T_0$$

$$T = N_S \cdot T_S$$

where $T_0$ is the excitation period of the excitation signal ($T_0=1/f_0$), where $N_P$, $N_T$, and $N_S$ are non-zero natural integers, and where $N_T$ is not a multiple of $N_S$. $N_T$ represents a scale factor.

In this example, each sampling point is thus shifted by an integer number $N_P$ of periods of the excitation signal plus a fraction thereof, with periodicity $N_S$ corresponding to the number of points defined for integration over each observation window of duration T.

From this approach, it follows that:

$T' P \cdot T_0$, where P is a non-zero natural integer such that:

$P = N_S \cdot N_P + N_T$.

Thus giving:

$$\frac{f_0}{f_S} = \frac{P}{N_S}.$$

It is thus possible to calculate possible values for $N_P$ and for $N_T$:

$$N_P = E\left(\frac{P}{N_S}\right)$$

$$N_T = P - N_S \cdot N_P.$$

The values of $N_S$ imply that $N_T$ of zero value or multiples of $N_S$ are excluded. Specifically, they correspond to a folding frequency of zero.

The output signal S from the singular quadrature demodulator, having a value that is calculated for each observation window of duration T, is such that:

$$S = \frac{\sqrt{\left[\sum_{i=0}^{N_S-1} e\left(\frac{i}{f_S}\right) \cdot \sin\left(2\pi f_0 \frac{i}{f_S}\right)\right]^2 + \left[\sum_{i=0}^{N_S-1} e\left(\frac{i}{f_S}\right) \cdot \cos\left(2\pi f_0 \frac{i}{f_S}\right)\right]^2}}{N_S}.$$

In this formula, i is the index of the sample points, $$\frac{i}{f_S}$$

represents time in the observation window and, as mentioned above, $N_S$ is the number of sample points per observation window. The instant 0 is taken as being the instant of the first sample among the $N_S$ samples in the observation window.

Attention is now given more particularly to the way in which the value of $N_S$ is defined.

The duration T of the observation window is defined first. This duration depends on the application in which the invention is implemented and, more particularly, on the refresh time of the measurement parameter that is required in the application.

In this example, operation of the antiskid loop is based on providing new speed data once every 400 microseconds (µs). The duration T of the observation window needs to be synchronized with the supply of speed data, and the duration T must therefore be equal to no more than 400 µs. If the duration T is selected to be less than 400 µs, it should preferably be a sub-multiple of 400 µs in order to the coherent with the rate of measurement.

In this example, the duration T is selected to be equal to 400 µs.

Since the excitation frequency $f_0$ is equal to 1 MHz, this gives:

P=400.

The number of sample points $N_S$ is defined so as to maximize elimination of harmonics of the excitation frequency $f_0$ and so as to maximize noise reduction in the digital envelope detector 20, while conserving a processing time for each sample point that is acceptable, given the performance of the analog-to-digital converter 22 and of the processor module 23.

Thus, the design of the electronic circuit 12 comprises the steps of:
- defining an optimized value for the number of sample points Ns, said the optimized value maximizing elimination of harmonics of the excitation frequency $f_0$ and maximizing noise reduction in the digital envelope detector 20, while conserving a processing time that is allocated to each sample point that is acceptable given the performance of the analog-to-digital converter 22 and given the processor component(s) 23; and
- configuring the electronic circuit by comparing said optimized value to the number of sample points Ns.

Attention is given initially to filtering the harmonics.

Figure 6:
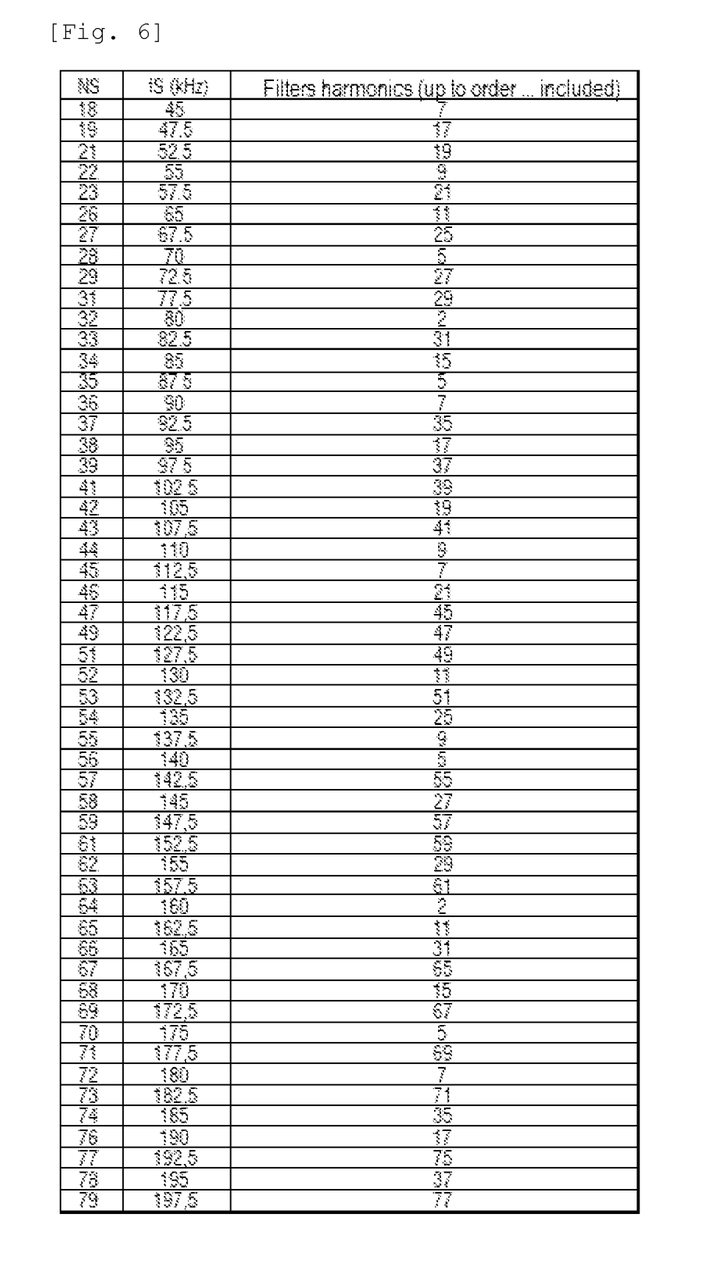
FIG. 6 is a table listing the values of $N_S$, together with the associated sampling frequencies and the orders of the filtered harmonics.

The table of FIG. 6 lists the values of $N_S$ that are acceptable in terms of performance relating to the harmonics, i.e. the values of $N_S$ that make it possible, in the digital envelope detector 20, to conserve properties of eliminating offset and of filtering harmonics (at least up to the second harmonic included).

For each value of $N_S$, the table also gives the associated sampling frequency and the order of the harmonics (included) up to which the value of $N_S$ enables the measurement signal to be filtered.

Figure 7:
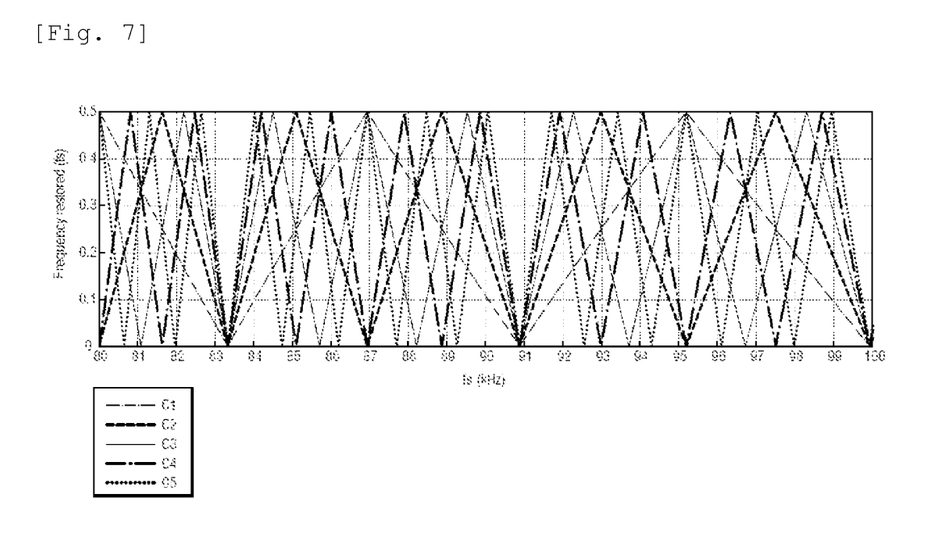
FIG. 7 is a graph comprising triangle function curves illustrating the spectrum folding phenomenon for the fundamental and for harmonics of orders 2 to 5, when $N_S \in [32, 39]$

FIG. 7 shows spectrum folding as a function of sampling frequency in the interval NS∈[32, 39]. Curve C1 shows spectrum folding for the fundamental. Curve C2 shows spectrum folding for the second harmonic (i.e. the harmonic of order 2). Curve C3 shows spectrum folding for the third harmonic (i.e. the harmonic of order 3). Curve C4 shows spectrum folding for the fourth harmonic (i.e. the harmonic of order 4). Curve C5 shows spectrum folding for the fifth harmonic (i.e. the harmonic of order 5).

Appropriately selecting Ns (i.e. the optimized value of Ns) enables the spectrum folding problem to be handled and can lead to selecting sampling frequencies that are not obvious a priori. Certain values of $N_S$ give $N_T$=1 and make it possible to produce sampling points such that the first intermediate signal X of the first branch of the synchronous quadrature demodulator 25 and the second intermediate signal Y of the second branch (sine channel) comprise sample points that follow one another in time in such a manner as to form two sinewaves in quadrature.

Figure 8:
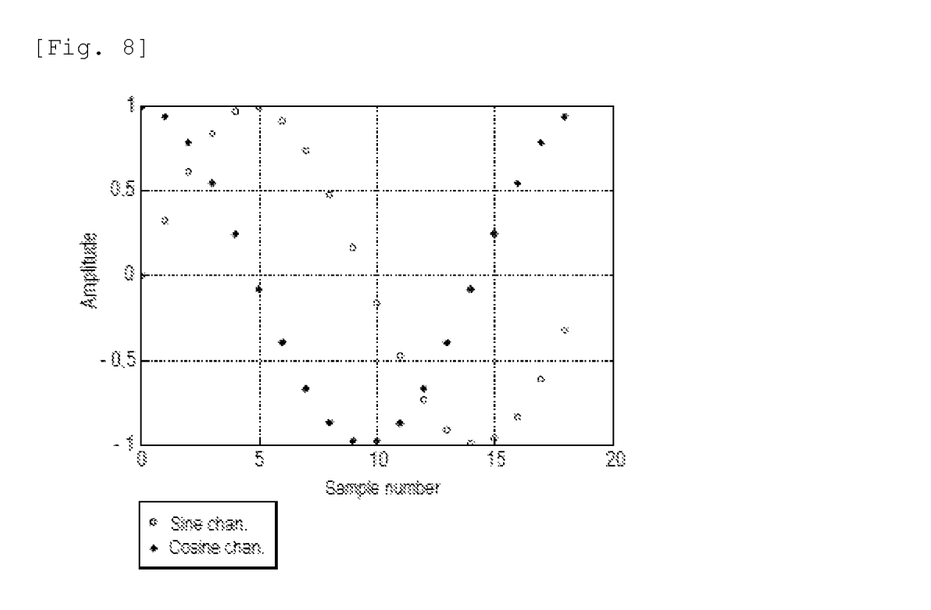
FIG. 8 is a graph of the reference sinewave samples in quadrature of the synchronous quadrature demodulator of FIG. 4, for $N_S=19$ and $N_T=1$.

For example, the sample points of the two reference sine waves in quadrature cos(ω0t) and sin(ω0t) are shown in FIG. 8 for $N_S$=19 and for $N_T$=1.

Figure 9:
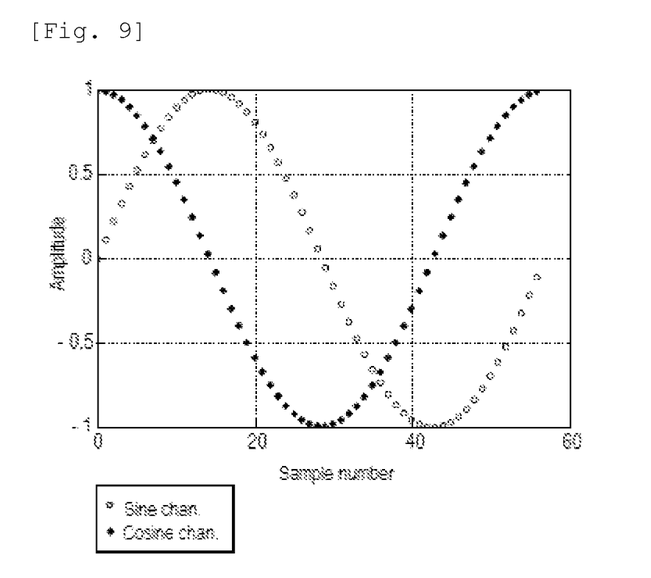
FIG. 9 is a graph of the reference sinewave samples in quadrature for $N_S=57$ and $N_T=1$.

The sample points of the two reference sinewaves in quadrature cos(ω0t) and sin(ω0t) are shown in FIG. 9 for $N_S$=57 and for $N_T$=1.

For the other values, the two reference sinewaves in quadrature comprise sample points that do indeed take their values on a sinewave but that do not follow one another in such a manner as to form two sinewave signals in quadrature and that appear to follow one another randomly.

Figure 10:
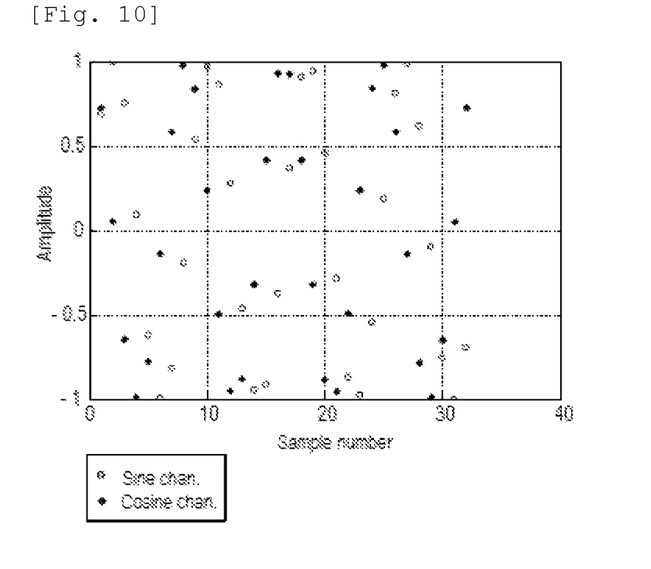
FIG. 10 is a graph of the reference sinewave samples in quadrature for $N_S=33$ and $N_T=4$.

The sample points of the two reference sinewaves in quadrature cos(ω0t) and sin(ω0t) are shown in FIG. 10 for $N_S$=33 and for $N_T$=4.

Figure 11:
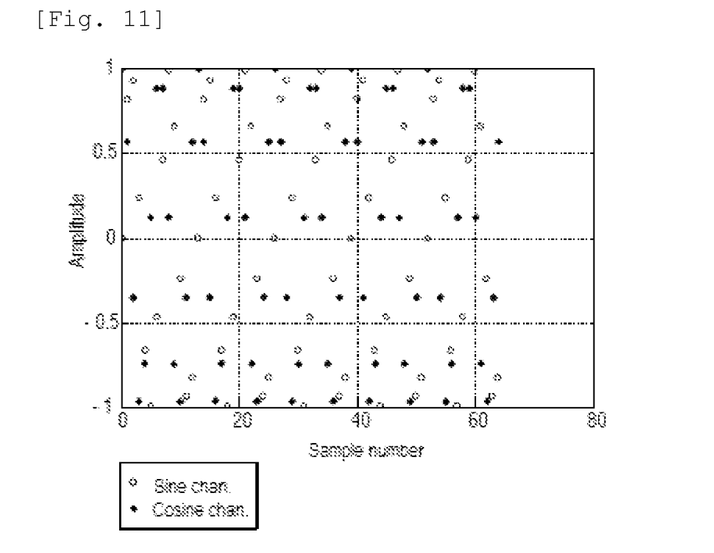
FIG. 11 is a graph of the reference sinewave samples in quadrature for $N_S=65$ and $N_T=10$.

The sample points of the two reference sinewaves in quadrature cos(ω0t) and sin(ω0t) are shown in FIG. 11 for $N_S$=65 and for $N_T$=10.

Attention is now given to measurement accuracy and to noise in the digital envelope detector 20.

Attention is given initially to the error associated with thermal noise in the acquisition system. This is error of random type.

At the output from the synchronous quadrature demodulator 25 there is a useful component relating to the amplitude of the fundamental:

$S=0.5 \cdot V_1$, and a noise component of root mean square (rms) value:

$$s_{rms} = \frac{\sigma_E}{\sqrt{N_S}},$$

there follows a half-normal relationship; with $\sigma_E = \sqrt{ENB_E} \cdot N_E;$ where $N_E$ is the noise spectral density expressed in volts per root hertz (V/Hz$^{1/2}$) and $ENB_E$ is the effective noise bandwidth satisfying the definition:

$$ENB_E = \frac{1}{|H_E(0)|^2} \int_0^\infty |H_E(f)|^2 df.$$

When considering a tachometer application, this gives rise to the following angle measurement error:

$$E[\varepsilon_\theta^2] = \frac{O^2}{M^2} \cdot \frac{ENB_E}{N_S} \cdot N_E^2,$$

where M is the level of the signal that is obtained at the output from the detector when the measurement winding 7 in question of the first printed circuit 1 (stator) is in alignment with the target winding 9 of the second printed circuit 2 (rotor).

For the tachometer configuration shown in FIG. 2 in which the angular spacing O is equal to 40°, and assuming a spectral noise density of 6 nanovolts per root hertz (nV/Hz$^{1/2}$), a first order Butterworth bandpass filter having a bandwidth of 1 MHz, integration over 33 samples and a useful signal of amplitude 500 millivolts (mV) (M=250 mV), a measurement error of 0.0002° rms is obtained, which is two orders of magnitude better than the performance that is required. The cut-off frequency of the input filter 21 thus constitutes a degree of freedom on which it is easy to act (potentially even eliminating the filter) in order to reduce sensitivity to deterministic measurement errors.

Attention is now given to the error associated with quantization noise. This is error of pseudo-random type.

Assuming infinite resolution for the reference sinewave, introducing quantization (on N code bits together with a sign bit) of the useful signal is represented as follows in the calculation of S:

$$S = \frac{\sqrt{\left[\sum_{i=0}^{N_S-1} \frac{E\left(e\left(\frac{i}{f_S}\right) \cdot 2^{Nbit} + \frac{1}{2}\right)}{2^{Nbit}} \cdot \sin\left(2\pi f_0 \frac{i}{f_S}\right)\right]^2 + \left[\sum_{i=0}^{N_S-1} \frac{E\left(e\left(\frac{i}{f_S}\right) \cdot 2^{Nbit} + \frac{1}{2}\right)}{2^{Nbit}} \cdot \cos\left(2\pi f_0 \frac{i}{f_S}\right)\right]^2}}{N_S}.$$

Figure 12:
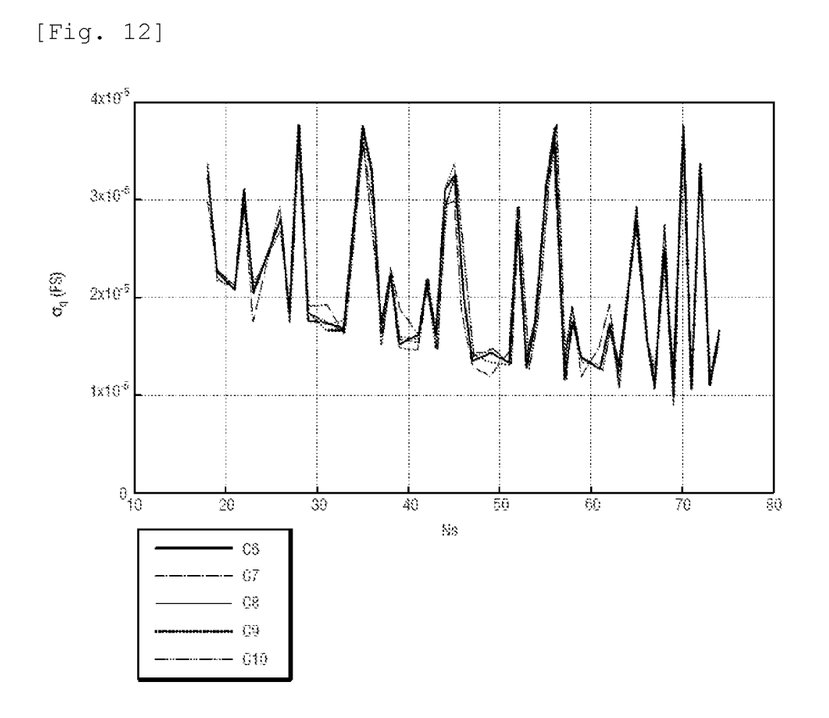
FIG. 12 is a graph of standard deviation curves for the quantization noise at the output from the synchronous quadrature demodulator as a function of $N_S$, for useful signals of different amplitudes.

FIG. 12 shows the standard deviation of the quantization noise at the output from the synchronous quadrature demodulator as a function of $N_S$, for useful signals of different amplitudes: curve C6 corresponds to a measurement signal that is a sinewave of amplitude equal to 100% of full-scale (FS) of the analog-to-digital converter 22, curve C7 corresponds to a measurement signal that is a sinewave of amplitude equal to 75% of full-scale, curve C8 corresponds to a measurement signal that is a sinewave of amplitude equal to 50% of full-scale, curve C9 corresponds to a measurement signal that is a sinewave of amplitude equal to 25% of full-scale, and curve C10 corresponds to a measurement signal that is a sinewave of amplitude equal to 12.5% of full-scale.

As expected theoretically, the rms value of the noise is established approximately as follows:

$$\sigma_q = \frac{q}{\sqrt{12 \cdot N_S}}.$$

The rms value of the noise is independent of the amplitude of the useful signal, and is equal to about $24 \cdot 10^{-6}$ FS rms for $N_S=33$ and an analog-to-digital converter operating on 11 code bits plus a sign bit ($\pm$FS).

When considering a tachometer application, this gives rise to the following angle measurement error:

$$E[\varepsilon_\theta^2] = \frac{O^2}{M^2} \cdot \frac{FS^2}{2^{2 \cdot Nbit}} \cdot \frac{1}{12 \cdot N_S},$$

where M is expressed in FS units.

For the tachometer configuration shown in FIG. 2 in which the angular spacing O is 40°, it is assumed that the quantization noise for the analog digital converter operating on 11 code bits plus one sign bit, for which FS=2 M, then the measurement error associated with quantization is equal to 0.002° rms. The pseudorandom nature of the error is illustrated by the non-monotonic nature of the curve in FIG. 12, which shows that, although the curve decreases overall, certain values of $N_S$ are locally more favorable than others.

Attention is now given to the error associated with inaccuracy in the components of the acquisition system.

This error is of deterministic type and is proportional to the useful signal.

Differentiating the expression for the angle θ enables the position error dθ to be associated with the relative measurement errors at the output from the detector $$\frac{dA}{A} \text{ and } \frac{dB}{B}:$$

$$d\theta = \frac{2 \cdot A \cdot B}{(A+B)^2} \cdot \left[\frac{dA}{A} - \frac{dB}{B}\right] \cdot \frac{O}{2}.$$

dθ is at a maximum for θ=0° and $$\frac{dA}{A} = -\frac{dB}{B} = \frac{dS}{S},$$

and it then takes the value:

$$d\theta_{max} = \frac{O}{2} \cdot \frac{dS}{S}.$$

The value O=40° leads to relative measurement accuracy for A and B that is better than $5 \cdot 10^{-4}$ for complying with the required performance of 0.01°.

Deterministic measurement error is associated mainly with unbalanced gain for the two amplifiers used for measuring A and B. This error depends on the type of amplifier used: an inverting amplifier, a non-inverting amplifier, and instrumentation amplifier, etc.

It is possible to reduce the error by having accurately controlled resistances in the two channels used for the radiometric measurement. It is therefore advantageous to make use of resistors forming part of a resistor network.

The deterministic measurement error is also associated with the input filter that is used. The measurement error depends in particular on the order of the filter.

The input filter comprises resistors and capacitors. Once again, it is advantageous to make use of resistors belonging to a resistor network and capacitors belonging to a capacitor network. Since the dispersion between components is greater for a capacitor network than for a resistor network, it is advantageous to arrange the above-described solution in such a manner as to push the cut-off frequency of the filter well above the working frequency $f_0$, or even so as to eliminate the filter, while having recourse solely to the intrinsic passband of the acquisition system (the amplifier 18 plus the analog-to-digital converter 22).

It is therefore logically preferable to select Ns to be as high as possible in order to reduce noise in the digital envelope detector 20 and in order to improve the accuracy of the measurements. It is also advantageous to select a value for $N_S$ that gives a local minimum in the quantization noise, as shown in FIG. 12.

Nevertheless, the higher $N_S$, the shorter the amount of processor time that can be allocated to each sample point.

For example, for $N_S=33$, the electronic circuit 12 has 12 μs ($N_P=12$ and $f_0=1$ MHz) for acquiring the six channels of the tachometer, and also for performing the two multiplyaccumulate operations performed in the synchronous quadrature demodulator 25 and required for each of the channels (i.e. about 1 μs for each multiplication-accumulation). For $N_S$=57, the electronic circuit has only 7 μs for performing acquisition and signal processing (i.e. about 500 ns for each multiplication-accumulation).

The value of $N_S$ that is selected is thus the result of a compromise serving both to maximize the elimination of harmonics of the excitation frequency and also to reduce noise in the digital envelope detector 20, but without that excessively reducing the processing time allocated to each sample point.

There are several technical solutions for implementing the synchronous quadrature demodulator 25.

By way of example, the processor module 23 may include both an FPGA that carries out the multiplication-accumulation operations performed in the synchronous quadrature demodulator 25, and also a microprocessor for carrying out the other operations performed in the synchronous quadrature demodulator 25 (and in particular for the final calculation). It is also possible to use a single microcontroller or microprocessor (with greater computation resources) for carrying out all of the operations performed in the synchronous quadrature demodulator 25.

At present, it is the second option that is easier to certify for application to a tachometer used in the antiskid function of an aircraft braking system.

In a configuration where $N_S$=33, T=400 μs, and $f_0$=1 MHz, the data rate between the analog-to-digital converter 21 and the processor module 23 is 6 times 16 bits, i.e. 96 bits, for transferring every 12 μs, which gives an average data rate of 8 megabits per second (Mbps), which is accessible for a serial peripheral interface (SPI) bus.

The sampling rate then becomes 82.5 thousand samples per second (ksps), which remains within the capabilities of many multichannel analog-to-digital converters with simultaneous sampling. The essential constraint remains the small signal passband, which is desired to be greater than 10 MHz. Assuming a maximum data rate of 20 Mbps on an SPI bus, the maximum possible number of samples $N_S$ is 79.

Naturally, the invention is not limited to the embodiment described, but covers any variant coming within the ambit of the invention as defined by the claims.

The above description relates to an excitation signal in the form of a sinewave, but that is naturally not essential. By way of example, the excitation signal could be a squarewave signal, which would require smaller computation resources.

The electronic unit is not necessarily connected to a single tachometer. By way of example, it is possible to have an architecture in which each undercarriage that has braked wheels includes one or two WRDCs connected to the tachometers of all of the wheels of said undercarriage.

Naturally, the sensor use is not necessarily a tachometer. The invention can be performed with any type of variable-excitation sensor, as for example with a rotary variable differential transformer (RVDT), with a resolver, with a proximity sensor, etc.

The invention claimed is:

1. An electronic circuit arranged to be connected to a variable-excitation sensor for measuring a parameter, the electronic circuit comprising:
    synthesizer components arranged to use the same clock signal to produce both an excitation frequency, a sampling frequency, and an excitation signal at the excitation frequency, the excitation signal being applied as input to the variable-excitation sensor; and
    a digital envelope detector receiving as input a measurement signal that is produced by the variable-excitation sensor in response to the excitation signal, the digital envelope detector comprising:
    an analog-to-digital converter arranged to sample the measurement signal at the sampling frequency in such a manner as to produce sample points during successive observation windows, each observation window having a duration T and comprising a number $N_s$ of sample points, the sample points being spaced apart by a sampling period $T_s$, the sampling period $T_s$ and the duration T being such that:

$$T_S = N_P \cdot T_0 + (N_T/N_S) \cdot T_0 \text{ and } T = N_S \cdot T_S,$$

where $T_0$ is one excitation period of the excitation signal, where $N_P$, $N_T$, and $N_S$ are non-zero natural integers, and where $N_T$ is not a multiple of $N_S$; and
    at least one processor component arranged to implement a synchronous demodulator arranged to produce, for each observation window, an output signal value on the basis of which the parameter is estimated.

2. The electronic circuit according to claim 1, wherein the number of sample points $N_s$ is defined so as to maximize elimination of harmonics of the excitation frequency and so as to maximize noise reduction in the digital envelope detector, while conserving a processing time allocated to each sample point that is acceptable given performances of the analog-to-digital converter and of the at least one processor component.

3. The electronic circuit according to claim 1, wherein $N_T$=1.

4. The electronic circuit according to claim 1, wherein $N_T \neq 1$.

5. The electronic circuit according to claim 1, wherein the excitation signal is a sinewave signal.

6. The electronic circuit according to claim 1, wherein the excitation signal is a squarewave signal.

7. The electronic circuit according to claim 1, wherein the digital envelope detector (20) comprises two processor components comprising both an FPGA arranged to carry out the multiplication-accumulation operations performed in the synchronous demodulator and also a microcontroller arranged to carry out the other operations performed in the synchronous demodulator.

8. The electronic circuit according to claim 1, further comprising an amplifier located upstream from the analog-to-digital converter, the amplifier including resistors forming part of a resistor network.

9. The electronic circuit according to claim 1, wherein the variable-excitation sensor has a plurality of output channels, and wherein the analog-to-digital converter comprises a single converter block together with a number of sample-and-hold circuits equal to the number of output channels of the variable-excitation sensor.

10. A method of designing the electronic circuit according to claim 1, the method comprising the steps of:
    defining an optimized value for the number of sample points $N_S$, said optimized value maximizing elimination of harmonics of the excitation frequency and maximizing noise reduction in the digital envelope detector, while conserving a processing time that is allocated to each sample point that is acceptable given the performance of the analog-to-digital converter and given the processor component(s); and
    configuring the electronic circuit by conferring said optimized value to the number of sample points $N_S$.

11. An electronic unit including the electronic circuit according claim 1.

12. A device comprising the electronic unit according to claim 11 and the variable-excitation sensor.

13. The device according to claim 12, the variable-excitation sensor being a tachometer arranged to measure the angular position and/or the angular speed of a wheel and comprising a first printed circuit and a second printed circuit that are adapted to be mounted facing each other, the first printed circuit being adapted to be mounted secured to an axle carrying the wheel, the second printed circuit being adapted to be mounted secured to the wheel, the first printed circuit comprising first tracks defining at least one transmitter winding and at least one measurement winding, the second printed circuit comprising second tracks defining at least one receiver winding and at least one target winding, and the electronic circuit being arranged to apply the excitation signal to the transmitter winding and to acquire the measurement signal from the measurement winding.

14. An aircraft braking system comprising the wheel fitted with a brake and with the device according to claim 13.

15. An aircraft including the braking system according to claim 14.

* * * * *